United States Patent [19]

Drutchas, deceased et al.

[11] Patent Number: 4,828,060
[45] Date of Patent: May 9, 1989

[54] AUXILIARY DRIVE CIRCUIT FOR AN ELECTRIC ASSIST STEERING SYSTEM

[75] Inventors: Gilbert H. Drutchas, deceased, late of Birmingham, Mich., by Elaine M. Drutchas, heir; John S. Borza, Sterling Hts., Mich.

[73] Assignee: TRW Inc., Lyndhurst, Ohio

[21] Appl. No.: 160,825

[22] Filed: Feb. 26, 1988

[51] Int. Cl.$^4$ .............................................. B62D 5/04
[52] U.S. Cl. .................................... 180/79.1; 180/133; 180/142
[58] Field of Search ...................... 180/79.1, 133, 142, 180/148

[56] References Cited

U.S. PATENT DOCUMENTS

| | | | |
|---|---|---|---|
| 2,716,706 | 8/1955 | Palmer | 180/79.1 |
| 2,954,671 | 10/1960 | Kress | 180/133 |
| 3,041,465 | 6/1962 | Ayre | 180/79.1 |
| 3,280,557 | 10/1966 | Sattavara | 180/133 |
| 3,418,487 | 12/1968 | Livingston | 180/79.1 |
| 3,434,282 | 3/1969 | Shelhart | 180/133 |
| 3,463,261 | 8/1969 | Runkle et al. | 180/133 |
| 3,795,285 | 3/1974 | Scholl et al. | 180/133 |
| 3,913,324 | 10/1975 | Miller et al. | 180/133 |
| 3,995,711 | 12/1976 | Kittle et al. | 180/133 |
| 4,238,690 | 12/1980 | Clarke | 307/44 |
| 4,342,922 | 8/1982 | DiMassimo et al. | 307/66 |
| 4,345,660 | 8/1982 | Miller | 180/133 |
| 4,598,787 | 7/1986 | Drutchas | 180/79.1 |
| 4,624,335 | 11/1986 | Shiraishi et al. | 180/133 |
| 4,751,978 | 6/1988 | Drutchas | 180/142 |

FOREIGN PATENT DOCUMENTS

84112152.8 of 0000 European Pat. Off. ........... 180/79.1

Primary Examiner—Charles A. Marmor
Assistant Examiner—Donn McGiehan
Attorney, Agent, or Firm—Tarolli, Sundheim & Covell

[57] ABSTRACT

An auxiliary drive circuit is disclosed for an electric, power assist steering system including an actuatable switching device which, when actuated, provides an auxiliary electrical path between a source of electrical energy and a mechanically actuatable reversing switch assembly for applying electrical power to energize an electric assist motor. The actuatable switching device in the auxiliary drive circuit is electrically connected in parallel to an actuatable switching device in a main drive circuit. A detector circuit monitors the operation of the main drive circuit and the output signal from a torque sensor. Upon detection of applied steering torque greater than a predetermined value and that the main drive circuit is not operating, the detector circuit outputs an electrical signal indicative thereof. A latching element latches the output of the detector circuit to actuate the actuatable switching device in the auxiliary drive circuit. Actuating the actuatable switching device in the auxiliary drive circuit provides an auxiliary connection of the electric assist motor to the source of electrical energy. In one embodiment, the auxiliary drive circuit, when actuated, permits maximum, continuous current flow through the power assist motor. In another embodiment, the auxiliary drive circuit provides a controllable amount of power assist in response to applied steering torque.

14 Claims, 2 Drawing Sheets

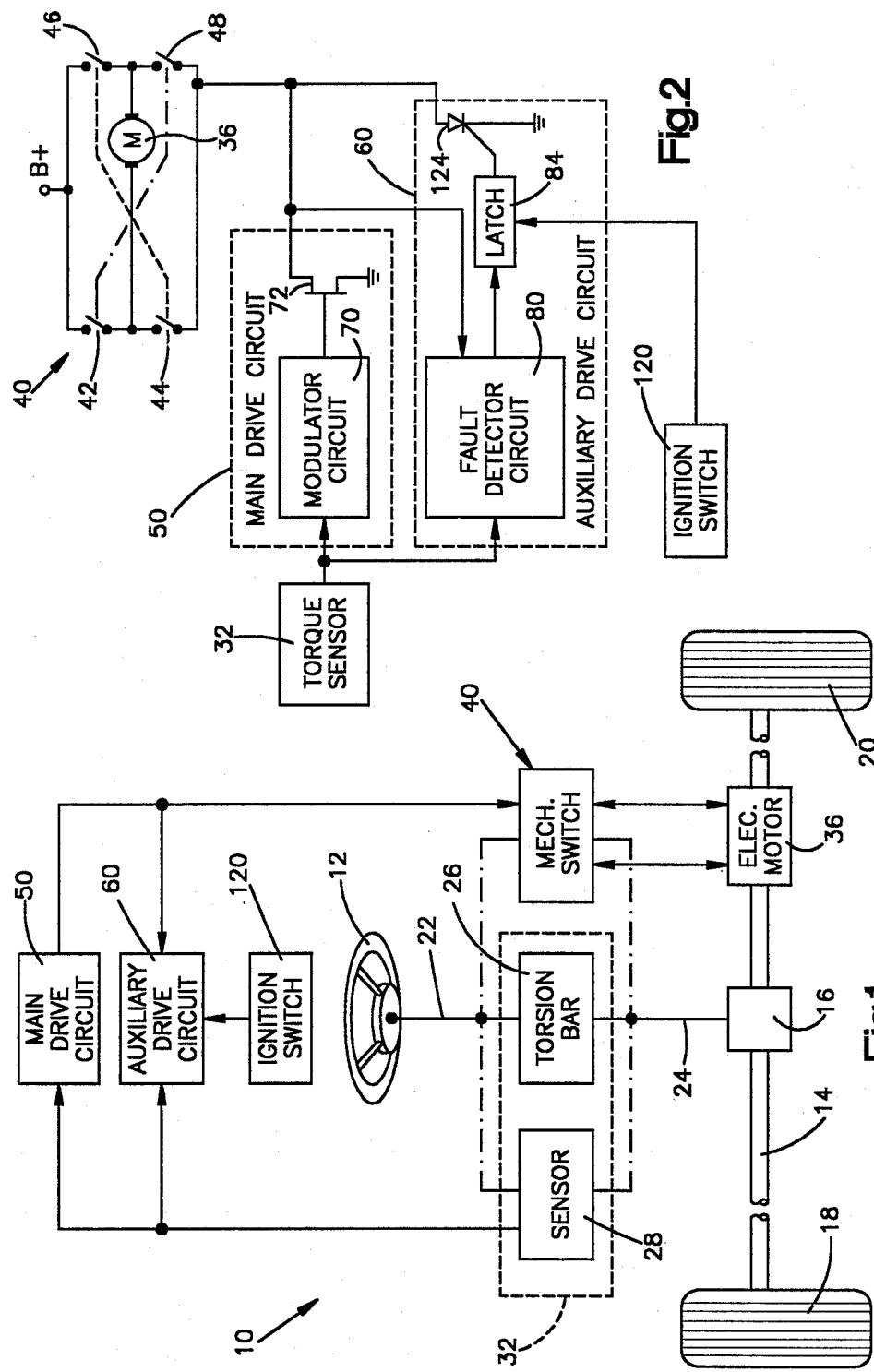

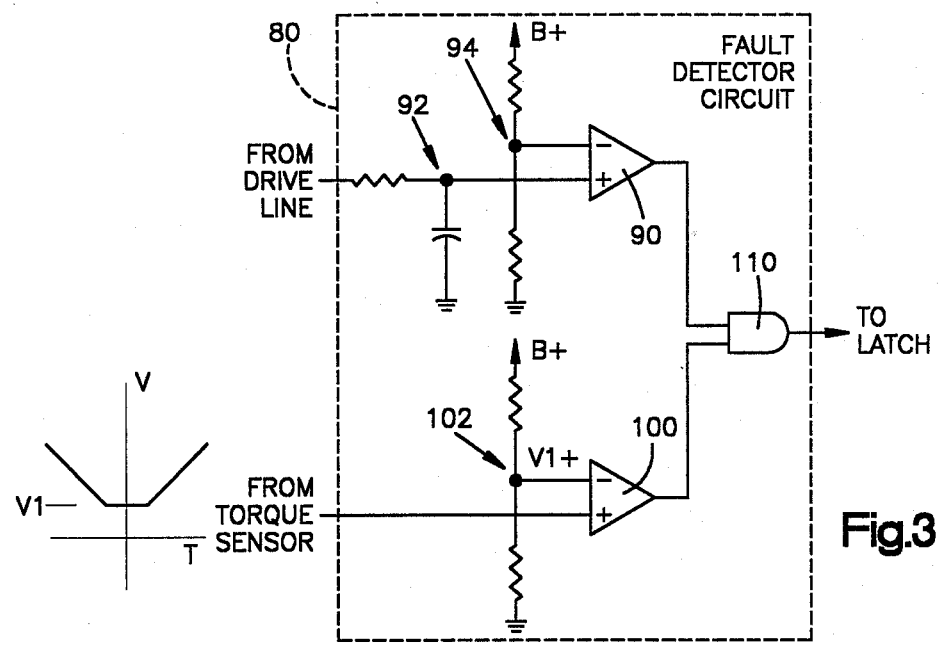
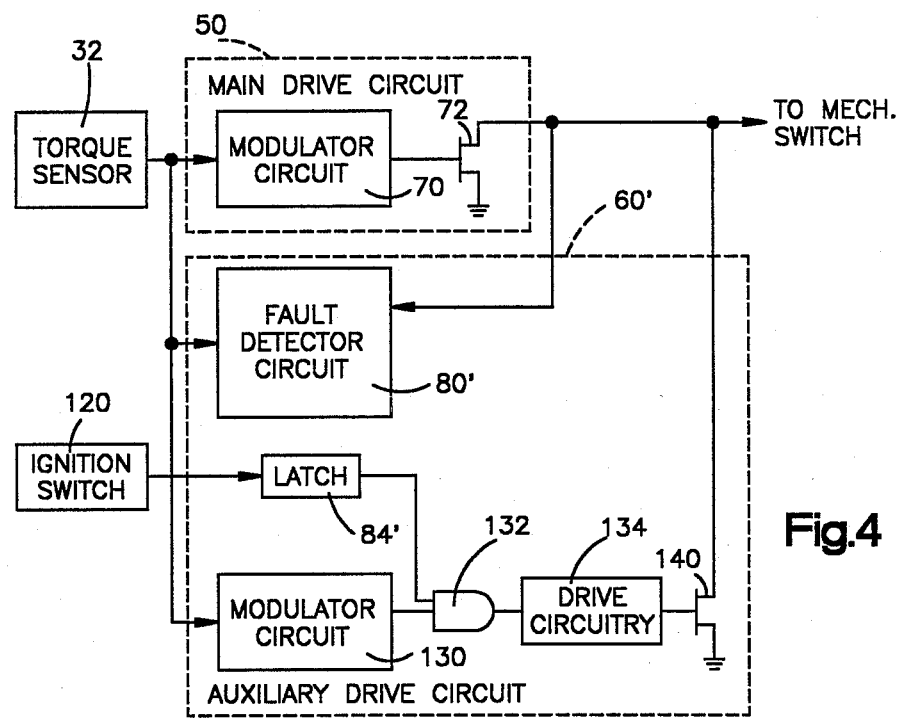

AUXILIARY DRIVE CIRCUIT FOR AN ELECTRIC ASSIST STEERING SYSTEM

TECHNICAL FIELD

The present invention relates to an electric assist steering system and is particularly directed to a circuit for providing a continued source of electric power to operate an assist motor in the event of a main drive circuit failure.

BACKGROUND OF THE INVENTION

Many power assist steering systems are available for use in automotive vehicles. Some steering systems provide assist by using hydraulic power, electric power, or a combination thereof. The use of an auxiliary or backup power source in a power assist steering system is known in the art. In such systems, a primary power source is employed during normal operation of the steering system to drive a power assist motor. A backup power source is usually maintained in a standby mode and is enabled for operation in the event of a failure of the primary power source. Thus, should the primary power source fail, power assist remains available by way of the backup power source. Once the primary power source is restored to working order, the backup power source is placed back into the standby mode.

U.S. Pat. No. 3,280,557 to Sattavara discloses a hydraulic power assist steering system having a primary pump and an auxiliary pump. Pressurized fluid is used to drive a hydraulic motor which provides the power assist. The primary pump is driven by the vehicle engine and is the main source of pressurized fluid for the power assist motor. The auxiliary pump is driven by the vehicle engine or by a separate electric motor. The output pressure from the primary pump is monitored by a pressure sensor. When the primary pump output pressure is less than a predetermined value, the auxiliary pump is actuated. In such an event, power assist remains available, the pressurized fluid to drive the hydraulic power assist motor being supplied by the auxiliary pump.

European Patent Application No. 84112152.8, Publication No. 0137491, discloses a microcomputer-based, fail-safe, steering control system. Power assist is provided by an electric assist motor which is electrically connectable between the positive terminal of the vehicle battery and ground potential through a switching transistor. A relay switch has its electrical contacts connected in parallel across the transistor. The relay contacts are normally closed. During normal operation, the relay is energized so that the contacts are open. The transistor is switched between an OFF condition and an ON condition by the microcomputer to control the amount of current through the electric assist motor. Should the microcomputer become disconnected from the battery, the relay contacts close to provide a current path to electrical ground so as to permit continued operation of the electric assist motor.

SUMMARY OF THE INVENTION

The present invention is directed to an electric assist steering system having an auxiliary drive circuit for providing a continued source of electric power to operate an electric power assist motor in the event of a failure of a main drive circuit. The present invention provides a novel and cost-effective auxiliary or backup drive circuit. The auxiliary drive circuit of the present invention includes an actuatable switching device electrically connected in parallel to an actuatable switching device in the main drive circuit. The auxiliary drive circuit further includes means to sense operation of the main drive circuit when steering torque is applied. If the main drive circuit should fail, i.e., not provide electrical power to drive the assist motor of the steering system when steering torque is applied, the auxiliary drive circuit is automatically actuated to connect the assist motor to a source of electrical power so as to provide the vehicle operator with continued power assist.

An auxiliary drive circuit, in accordance with the present invention, is for use in an electric power assist steering system having an electric assist motor and a main drive circuit connectable to the electric assist motor through a mechanically actuatable reversing switch assembly. The main drive circuit energizes the electric assist motor in response to an output signal from a steering torsion sensing device by controlling the amount of current through the electric assist motor from a source of electrical energy. A value of the output signal from the torsion sensing device varies as a function of applied steering torque. The auxiliary drive circuit comprises means for, when actuated, providing an auxiliary connection between the source of electrical energy and the mechanically actuatable reversing switch assembly through the electric assist motor.

The auxiliary drive circuit further includes fault detection means for sensing a failure in the main drive circuit. The fault detection means includes first means for sensing an electrical output signal from the torsion sensing device and for outputting one electrical signal when applied steering torque is equal to or less than a predetermined value and a second electrical signal when applied steering torque is greater than the predetermined value. The fault detection means further includes second means for sensing application of electrical power by the main drive circuit to the electric assist motor when applied steering torque is greater than the predetermined amount and for outputting one electrical signal when the main drive circuit is applying electrical power to the electric assist motor and a second electrical signal when the main drive circuit is not applying electrical power to the electric assist motor. The auxiliary drive circuit further includes means for actuating the auxiliary connection means in response to (i) the first sensing means indicating applied steering torque above a predetermined amount and (ii) the second sensing means indicating the main drive circuit is not applying electrical power to the electric assist motor.

In one embodiment of the present invention, a main drive circuit includes a modulator circuit for generating a pulse-width modulated signal in response to the output signal from a torsion sensing device. The main drive circuit further includes an actuatable field-effect transistor ("FET") which is connected between a mechanically actuatable reversing switch assembly and one potential of the vehicle battery. In response to the pulse-width modulated signal from the modulator circuit, the FET is switched between an OFF condition and an ON condition to control the current flow through an electric assist motor. The current flow is functionally related to the duty cycle of the pulse-width modulated signal.

An auxiliary drive circuit is provided and includes a silicon controlled rectifier ("SCR") which is connected in parallel with the FET in the main drive circuit. A fault detector circuit in the auxiliary drive circuit includes two comparators. One comparator is responsive to the output signal from the torsion sensing device, and the other comparator is responsive to an output signal from the main drive circuit. The outputs of the comparators are ANDED to provide the output signal of the fault detector circuit.

If the applied steering torque is greater than a predetermined value, as indicated by the output signal from the torsion sensing device, and the output signal from the main drive circuit is indicative of the main drive circuit not applying electrical power to the electric assist motor, then the fault detector circuit provides an output signal indicative thereof. This output signal from the fault detector circuit is latched to trigger and maintain the SCR in an ON condition. When the SCR is ON and a pair of switches in the mechanically actuatable reversing switch assembly is closed, maximum current flows through the electric assist motor to provide the maximum power assist. The latched output signal of the fault detector circuit is reset by cycling the vehicle ignition switch.

In a second embodiment of the present invention, the auxiliary drive circuit is a modification of the auxiliary drive circuit in the first embodiment. The modified auxiliary drive circuit includes an identical fault detector circuit as in the first embodiment, and also includes an actuatable FET connected in parallel to the actuatable FET in the main drive circuit. The modified auxiliary drive circuit further includes a second modulator circuit for generating a pulse-width modulated signal in response to the output signal from the torsion sensing device. In response to the pulse-width modulated signal from the second modulator circuit and the latched output signal from the fault detector circuit, the FET in the modified auxiliary drive circuit is switched between an OFF condition and an ON condition to control the current flow through the electric assist motor in response to applied steering torque.

BRIEF DESCRIPTION OF THE DRAWINGS

Other features and advantages of the present invention will be apparent to those skilled in the art by reference to the following detailed description taken in connection with the accompanying drawings wherein:

FIG. 1 is a schematic block diagram of a power assist steering system incorporating control circuitry made in accordance with the present invention;

FIG. 2 is a schematic block diagram illustrating an embodiment of the control circuitry of FIG. 1;

FIG. 3 is a detailed schematic circuit diagram illustrating the fault detector circuit shown in FIG. 2; and FIG. 4 is a schematic block diagram illustrating another embodiment of the control circuitry of FIG. 1.

DETAILED DESCRIPTION

Referring to FIG. 1, a power assist steering system 10 includes a steering wheel 12 operatively connected to a steering member 14 through a rack and pinion gear set 16 as is well known in the art. The steering member 14 is in force transmitting engagement with steerable wheels 18, 20 of the vehicle.

The steering wheel 12 is connected to an input shaft 22 which is in turn connected to a pinion shaft 24 through a torsion bar 26. The input shaft 22 and the pinion shaft 24 are relatively rotatable. The torsion bar 26 resists such relative rotation. The specific arrangement of an input shaft, a torsion bar and a pinion shaft are fully disclosed in U.S. Pat. No. 4,598,787 to Drutchas, which is assigned to the assignee of the present application, and is hereby fully incorporated herein by reference.

When it is desirable to turn the vehicle's steerable wheels 18, 20, torque is applied to the steering wheel 12. The amount of applied torque necessary to accomplish a steering maneuver is a function of the road surface friction and the speed of the vehicle. When steering torque is applied to the steering wheel 12, the input shaft 22 rotates relative to the pinion shaft 24 by an amount which is a function of the applied steering torque and the resiliency characteristics of the torsion bar 26. A position sensor 28 is provided for sensing the amount of relative rotation between the input shaft 22 and the pinion shaft 24. The position sensor 28 in combination with the torsion bar 26 provides a torque sensor 32.

An electric assist motor 36 circumscribes the steering member 14 and is drivably coupled thereto through a ball nut drive arrangement (not shown). One such ball nut drive arrangement that can be utilized with the present invention is fully described in U.S. Pat. No. 4,515,054 to Drutchas, now reissued U.S. Pat. No. Re. 32,222, which is hereby fully incorporated herein by reference.

A mechanical switch assembly 40 is connected to the input shaft 22 and to the pinion shaft 24 across the torsion bar 26. Referring to FIG. 2, the mechanical switch assembly 40 includes four mechanically actuatable switches 42, 44, 46, and 48 connected in an "H" network. The switches 42, 44, 46 and 48 are mechanically coupled across the torsion bar 26 in such a fashion that twisting of the torsion bar causes actuation of the switches in pairs.

The four switches are normally open when no torque is applied to the steering wheel 12. The switches close in pairs upon application of steering torque to the steering wheel 12. If steering torque is applied to the steering wheel 12 in one direction, switches 42, 48 close. If steering torque is applied to the steering wheel 12 in the other direction, switches 44, 46 close.

The junction of switches 42, 44 is connected to one terminal of the electric assist motor 36. The junction of switches 46, 48 is connected to the other terminal of the electric assist motor 36. The junction of switches 44, 48 is electrically connected to a main drive circuit 50 and to an auxiliary drive circuit 60. The junction of switches 42, 46 is connectable to the positive potential of a source of electrical energy, such as, the vehicle battery. Such a mechanical switch assembly is fully disclosed in the above incorporated '787 patent to Drutchas.

The main drive circuit 50 includes a modulator circuit 70 having its input connected to the torque sensor 32. The output of the modulator circuit 70 is operatively connected to the control input of a field effect transistor ("FET") 72. One terminal of the FET 72 is connected to electrical ground and the other terminal is connected to the junction of switches 44, 48. The modulator circuit 70 outputs a pulse-width modulated signal having a duty cycle that varies as a function of the output signal of the torque sensor 32. The current through the electric assist motor 36 varies as a function of the ON time of the FET 72. The switches 42, 44, 46, 48 control the direction of electric current through the motor 36 while the modulator circuit 70 controls the amount of current in response to the sensed applied steering torque.

The auxiliary drive circuit 60 includes a fault detector circuit 80 having one input operatively connected to the output of the torque sensor 32. Another input of the fault detector circuit 80 is operatively connected to the junction of switches 44, 48. The output of the fault detector circuit 80 is operatively connected to a latch 84.

Referring to FIG. 3, the fault detector circuit 80 includes a first comparator 90 having its noninverting input connected to the junction of switches 44, 48 through a resistor/capacitor ("RC") network 92. A voltage dividing network 94 is operatively connected across the vehicle battery and coupled to the inverting input of comparator 90 to provide a reference voltage. The RC network 92 provides a DC voltage having a value that varies as a function of the duty cycle of the output of the main drive circuit 50. The value of the voltage reference input to comparator 90 is equal to a value which is slightly less than the maximum steady-state value present across the capacitor in the RC network 92 when the main drive circuit is connected to the electric assist motor through the reversing switch assembly 40 and FET 72 is OFF.

When all the switches in the reversing switch assembly 40 are open, the voltage across the capacitor in network 92 is ground. The output of comparator 90 is then at a digital LOW. Once a pair of switches are closed in the reversing switch assembly 40, the RC network 92 is connected to the battery potential B+ through the motor coil of the electric assist motor 36 and the capacitor charges. The voltage across the capacitor in network 92 is then equal to the battery voltage B+. The network 94 provides a reference voltage to the inverting input having a value slightly less than the battery voltage B+. Therefore, as soon as a pair of switches close in assembly 40 and the capacitor in network 92 charges to B+, the output of 90 switches to a digital HIGH.

The voltage value at the noninverting input of comparator 90 decreases as the ON time of FET 72 increases. When the main drive circuit 50 is operating at a predetermined minimum duty cycle, the output of comparator 90 switches to a digital LOW.

The fault detector circuit 80 further includes a second comparator 100 having its noninverting input connected to the torque sensor 32 and its inverting input connected to a voltage dividing network 102. The voltage dividing network 102 provides a voltage reference to comparator 100. The torque sensor, in accordance with a preferred embodiment, outputs a minimum voltage value V1 when no torque is applied to the steering wheel 12. After an amount of torque greater than a predetermined amount is applied to the steering wheel 12 that insures that a pair of switches in assembly 40 are closed, the value of the torque signal increases regardless of the direction of the applied torque. The value of the reference voltage provided by network 102 is equal to V1 plus a predetermined amount.

When no torque is applied to the steering wheel 12, the output of comparator 100 is a digital LOW. When a sufficient amount of torque is applied to the steering wheel 12 so as to increase the torque signal output to a value greater than the predetermined reference value (V1+) at the inverting input of comparator 100, the output of comparator 100 switches to a digital HIGH. It will be appreciated that the reference voltage (V1+) at the inverting input of comparator 100 must be a value sufficient to insure the main drive circuit begins to modulate before the torque signal reaches a value equal to V1+. Under normal operating conditions, the output of comparator 90 must switch to a digital LOW before the output of comparator 100 switches to a digital HIGH. The main drive circuit should be drawing current through the electric assist motor by the time the output signal reaches a value equal to V1+.

The output of comparator 90 and comparator 100 are operatively connected to an AND gate 110. The output of the AND gate 110 is operatively connected to the latch 84. The fault detector circuit 80 outputs a digital HIGH from the AND gate 110 when (1) steering torque is applied to the vehicle steering wheel greater than a predetermined value, and (2) the FET 72 of the main drive circuit 50 is not modulating. Such an occurrence is considered a fault condition.

A fault condition will occur if the modulator circuit 70 or the FET 72 is defective. Also, a fault condition will occur if an open circuit exists between the modulator circuit and the FET or if the FET becomes disconnected from either the reversing switch assembly or the ground potential of the vehicle battery.

When the output of AND gate 110 is in the digital HIGH state, the latch 84 is set and may be reset by cycling a vehicle ignition switch 120 operatively connected to the latch 84. The output of latch 84 is connected to the control input of a silicon controlled rectifier ("SCR") 124. The SCR 124 is operatively connected between the junction of switches 44, 48 and electrical ground. Once a fault is detected by the fault detector circuit 80, the latch 84 is set. The SCR 124 is thereby turned ON to provide maximum power assist to the steering system 10 upon closure of a pair of switches in the mechanical switch assembly 40.

FIG. 4 illustrates a second embodiment of the present invention. The auxiliary drive circuit 60' includes a fault detector circuit 80' identical to the fault detector circuit described above with regard to FIG. 2. Upon detection of a fault, i.e., steering torque greater than a predetermined value is applied and the main drive circuit is not providing current flow through the power assist motor 36, a latch 84' is set. A modulator circuit 130 is operatively connected to the output of the torque sensor 32 and outputs a pulse-width modulated signal to a first input of an AND gate 132. The duty cycle of the output signal of modulator circuit 130 functionally related to applied steering torque. The output of the latch 84' is operatively connected to a second input of the AND gate 132.

When the latch 84' is set, a digital HIGH is output to the AND gate 132. The output of AND gate 132 is a pulse-width modulated signal having a duty cycle equal to the duty cycle of the output of the modulator circuit 130. The output of the AND gate 132 is operatively connected to a drive circuit 134 which is, in turn, operatively connected to the control input of a FET 140. The FET 140 has one terminal connected to electrical ground and the other terminal connected to the junction of switches 44, 48 of the mechanical switch assembly 40. Current flow through the electric assist motor 36 varies as a function of the ON time of the FET 140.

From the above description of preferred embodiments of the invention, those skilled in the art will perceive improvements, changes and modifications. Such improvements, changes and modifications within the skill of the art are intended to be covered by the appended claims.

Having described a preferred embodiment of the invention, the following is claimed:

1. An auxiliary drive circuit for use in an electric power assist steering system having an electric assist motor and a main drive circuit connectable to the electric assist motor through a mechanically actuatable reversing switch assembly for applying electrical power to energize the electric assist motor in response to an output signal from a torsion sensing device by controlling the amount of current through the electric assist motor from a source of electrical energy, a value of the output signal from the torque sensing device varying as a function of applied steering torque, said auxiliary drive circuit comprising:

means for, when actuated, providing an auxiliary electrical path between the source of electrical energy and the mechanically actuatable reversing switch assembly through the electric assist motor;

fault detection means for sensing a fault condition in the main drive circuit, said fault detection means including first sensing means for sensing an electrical output signal from the torsion sensing device and for outputting one electrical signal when steering torque is not being applied and a second electrical signal when steering torque is being applied, second sensing means for sensing operation of the main drive circuit and for outputting an electrical signal indicative of the main drive circuit applying electrical power to the electric assist motor; and means for actuating said auxiliary electrical path means in response to (i) said first sensing means indicating application of steering torque, and (ii) said second sensing means indicating the main drive circuit is not applying electrical power to the electric assist motor.

2. The apparatus of claim 1 wherein said first sensing means includes a comparator having its noninverting input connected to the torque sensor signal and its inverting input connected to a reference voltage having a value slightly greater than a no-applied steering torque output value from the torque sensor.

3. The apparatus of claim 1 wherein said second means includes a comparator having its noninverting input connected to a junction between the main drive circuit and the mechanically actuatable reversing switch assembly through a resistor and capacitor filter combination, and its inverting input connected to a reference voltage having a value slightly less than the maximum steady-state value of the voltage present at the resistor capacitor junction when the reversing switch assembly is closed and the main drive circuit is not energized.

4. The apparatus of claim 1 wherein said auxiliary electrical path means includes a silicon controlled rectifier having its anode connected to the junction of the mechanically actuatable reversing switch assembly and the main drive circuit, its cathode connected to one potential of the source of electrical energy and its gate connected to said means for actuation.

5. The apparatus of claim 4 wherein said actuating means includes a latch circuit, said latch circuit maintaining said silicon controlled rectified in an ON condition upon detection of a fault.

6. The apparatus of claim 1 wherein said auxiliary electrical path means includes a field-effect transistor connected between the source of electrical energy and the junction of the mechanically actuatable reversing switch assembly and the main drive circuit.

7. The apparatus of claim 6 wherein said actuating means includes a modulator circuit, said modulator circuit outputting a pulse-width modulated signal, the pulse-width modulated signal varying as a function of the applied steering torque, said field-effect transistor of said auxiliary electrical path means being responsive to the pulse-width modulated signal.

8. The apparatus of claim 7 wherein said actuating means includes a latch circuit responsive to said first sensing means and said second sensing means for maintaining an output signal indicative of a fault condition when said first sensing means indicates application of steering torque and said second sensing means indicates the main drive circuit is not applying electrical power to the electric assist motor, and an ANDING means, said modulator circuit and said latch circuit connected to said ANDING means, said ANDING means passing the output of said modulator circuit to said field-effect transistor of said auxiliary electrical path means when said latch circuit outputs a signal indicative of a fault condition.

9. An auxiliary drive circuit for use in an electric power assist steering system having an electric assist motor and a main drive circuit connectable to the electric assist motor through a mechanically actuatable reversing switch assembly for applying electrical power to energize the electric assist motor in response to an output signal from a torsion sensing device by controlling the amount of current through the electric assist motor from a source of electrical energy, a value of the output signal from the torque sensing device varying as a function of applied steering torque, said auxiliary drive circuit comprising:

means for, when actuated, providing an auxiliary electrical path between the source of electrical energy and the mechanically actuatable reversing switch assembly through the electric assist motor;

fault detection means for sensing a fault condition in the main drive circuit, said fault detection means including first sensing means for sensing an electrical output signal from the torsion sensing device and for outputting an electrical signal when steering torque greater than a predetermined value is being applied, second sensing means for sensing operation of the main drive circuit and for outputting an electrical signal when the main drive circuit applies electrical power to the electric assist motor; and means for actuating said auxiliary electrical path means in response to (i) said first sensing means indicating application of steering torque greater than said predetermined value, and (ii) said second sensing means indicating the main drive circuit is not applying electrical power to the electric assist motor.

10. The apparatus of claim 9 wherein said auxiliary electrical path means includes a silicon controlled rectifier having its anode connected to the junction of the main drive circuit, its cathode connected to one potential of the source of electrical energy and its gate connected to said means for actuation.

11. The apparatus of claim 10 wherein said actuating means includes a latch circuit, said latch circuit maintaining said silicon controlled rectified in an ON condition upon detection of a fault.

12. The apparatus of claim 9 wherein said auxiliary electrical path means includes a field-effect transistor connected between the source of electrical energy and the junction of the mechanically actuatable reversing switch assembly and the main drive circuit.

13. The apparatus of claim 12 wherein said actuating means is a modulator circuit, said modulator circuit outputting a pulse-width modulated signal, the pulse-width modulated signal varying as a function of the applied steering torque, said field-effect transistor of said auxiliary electrical path means being response to the pulse-width modulator signal.

14. The apparatus of claim 13 wherein said actuating means includes a latch circuit responsive to said first sensing means and said second sealing means for maintaining an output signal indicative of a fault condition when said first sensing means indicates application of steering torque greater than said predetermined value and said second sensing means indicates the main drive circuit is not applying electrical power to the electric assist motor, and an ANDING means, said modulator circuit and said latch circuit connected to said ANDING means, said ANDING means passing the output of the modulator circuit to said field-effect transistor of said auxiliary electrical path means when said latch circuit outputs a signal indicative of a fault condition.

* * * * *

UNITED STATES PATENT AND TRADEMARK OFFICE
CERTIFICATE OF CORRECTION

PATENT NO.　: 4,828,060

DATED　　　 : May 9, 1989

INVENTOR(S) : Gilbert H. Drutchas, deceased, Elaine M. Drutchas, heir and John S. Borza It is certified that error appears in the above-identified patent and that said Letters Patent is hereby corrected as shown below:

Column 8, Line 59, before "main" insert --mechanically actuatable reversing switch assembly and the---.

Column 9, Line 8, change "response" to --responsive--.

Column 9, Line 12, change "sealing" to --sensing--.

Column 10, Line 9, change "the" to --said--.

Signed and Sealed this

Twenty-seventh Day of March, 1990

Attest:

JEFFREY M. SAMUELS

Attesting Officer

Acting Commissioner of Patents and Trademarks